United States Patent [19]

Fahmi et al.

[11] Patent Number: 5,668,797
[45] Date of Patent: Sep. 16, 1997

[54] TRAFFIC CONTROLLER FOR CELL-BASED TRANSMISSION

[75] Inventors: Maher Nihad Fahmi, Vancouver; John Richard Bradshaw, Burnaby, both of Canada

[73] Assignee: PMC-Sierra, Inc., Canada

[21] Appl. No.: 568,379

[22] Filed: Dec. 6, 1995

[51] Int. Cl.$^6$ ............................................. H04J 1/16
[52] U.S. Cl. ............................................. 370/229
[58] Field of Search ............................ 370/13, 60, 60.1, 370/94.1, 94.2, 84, 229, 230, 232–235, 252, 358, 389, 391, 392, 395, 412, 413, 416

[56] References Cited

U.S. PATENT DOCUMENTS 5,247,439  9/1993  Gurmu et al. ............... 364/424.02

OTHER PUBLICATIONS

ITU–T Recommendation I.371 dated Mar. 1993, entitled: Integrated Services Digital Network (ISDN) Overall Network Aspects and Functions Traffic Control and Congestion Control in B–ISDN.

*Primary Examiner*—Dang Ton
*Attorney, Agent, or Firm*—Myers Liniak & Berenato

[57] ABSTRACT

A device for identifying cells as either conforming or non-conforming in a cell-based transmission system, which includes an n-bit word-length counter having an input coupled to a source of clock pulses, a parallel n-word gate coupled to a parallel output of the n-bit word length counter and having a gate input coupled to a source of cell arrival signals. A processor is coupled to an output of gate having a first comparer for comparing TAT and $t_a(k)$, a second comparer for comparing $t_a(k)[n-1]$ with zero and $t_a(k-1)[n-1]$ with 1, a setting device for setting TAT=$t_a(k)$ in the event that either of the comparisons in the first and second comparers are true. A third comparer is provided for comparing TAT and $t_a(k)$+L and if TAT is less than or equal to $t_a(k)$+L, an indexing device for indexing TAT by I and declaring the cell conforming, and an output device for declaring the cell non-conforming if TAT is greater than $t_a(k)$+L.

5 Claims, 5 Drawing Sheets

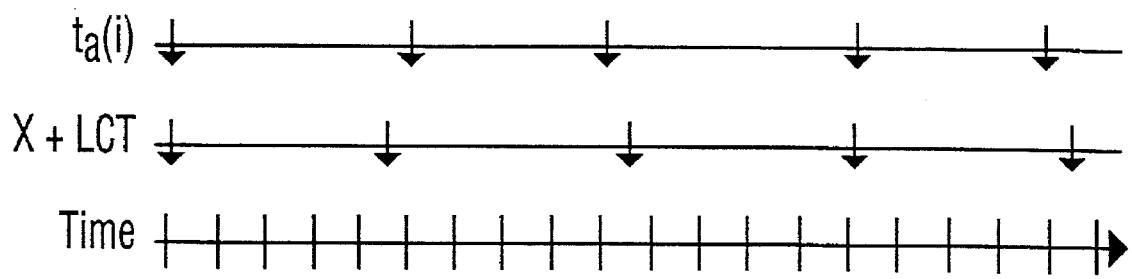
FIG. 3 ($L = 0.5\delta$)
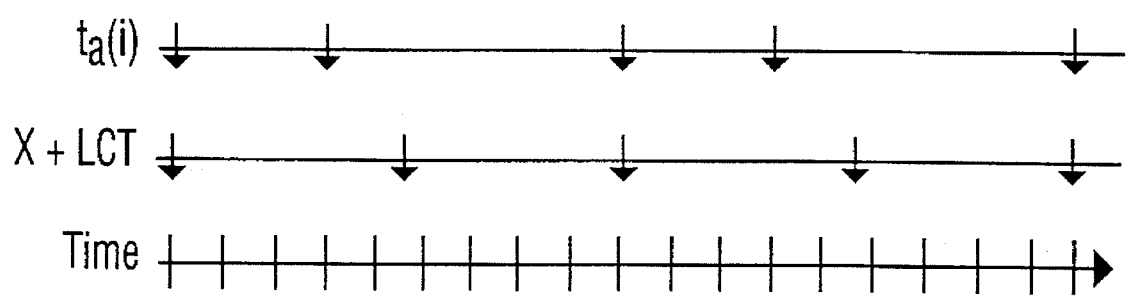
FIG. 4 ($L = 1.5\delta$)
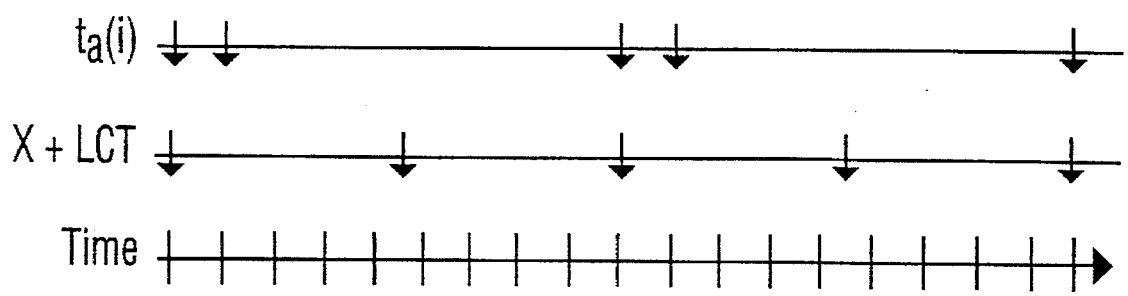
FIG. 5 ($L = 3.5\delta$)

TRAFFIC CONTROLLER FOR CELL-BASED TRANSMISSION

The present invention relates to apparatus and method for traffic control of cell traffic in cell-based transmission such as ATM cell transmission.

BACKGROUND

In cell-based transmission systems congestion can occur because of such factors as unpredictable statistical fluctuation of traffic flows and fault conditions within the network. Traffic control in such systems refers to the set of actions taken by the network to avoid congested conditions. In an ATM system, traffic parameters describe traffic characteristics of an ATM connection. A traffic parameter is a specification of a particular traffic aspect. It may be quantitative or qualitative. Traffic parameters may for example describe Peak Cell Rate, Sustainable Cell Rate, Burst Tolerance, and/or source type (e.g., telephone, video phone). The list of traffic parameters that can be used to capture the traffic characteristics of an ATM connection is referred to as the ATM Traffic Descriptor. There are various subsets of An ATM Traffic Descriptor such as a Source Traffic Descriptor and a Connection Traffic Descriptor.

The Connection Traffic Descriptor specifies the traffic characteristics of the ATM Connection at a public or private User Network Interface (UNI). It is made up of the set of parameters in the Source Traffic Descriptor, the Cell Delay Variation (CDV) Tolerance and the Conformance Definition that is used to unambiguously specify the conforming cells of the ATM connection. The characteristics of an ATM Connection at a private or public UNI, which are negotiated, are referred to as the Traffic Contract. The conformance definition used to specify the conforming cells of an ATM Connection at the UNI are based on a generic cell rate algorithm. There are two Cell Rate Algorithms that are in general use for determining whether a given cell conforms with the Traffic Contract, namely, the Virtual Scheduling Algorithm and a continuous-state Leaky Bucket Algorithm. However, in making these algorithms realizable in hardware in which finite word lengths must be used to represent both the arrival times and the other parameters, false identifications of non-conforming cells occur. In addition, with very slow rate connections, there is a further problem of reliability in identifying non-compliant cells.

Accordingly, it is an object of the invention to provide a method and apparatus for carrying out a cell rate time of arrival algorithm which avoids false identifications of non-conforming cells.

SUMMARY OF THE INVENTION

According to the invention there is provided a device for identifying cells as either conforming or non-conforming in a cell-based transmission system, which includes an n-bit word length counter having an input coupled to a source of clock pulses, a parallel n-bit word length gate coupled to a parallel output of the n-bit word length counter and having a gate input coupled to a source of cell arrival signals. A processor is coupled to an output of the gate having means for determining if a theoretical arrival time TAT is less than an arrival time for a $k^{th}$ cell, $t_a(k)$, where k is an integer, or an $(n-1)^{th}$ bit of $t_a(k)$, namely $t_a(k)[n-1]$, is zero and an $(n-1)^{th}$ bit of an arrival time for a $(k-1)^{th}$ cell, namely $t_a(k-1)[n-1]$, is one (referred to as the "Test Conditions"); means for setting TAT equal to $t_a(k)$ if either of the Test Conditions are true; and means for determining if TAT is greater than $t_a(k)+L$, where L is a limit value for cell time of arrival variation if all of the Test Conditions are not true. The processor further includes means for identifying a cell non-conforming if TAT is greater than $t_a(k)+L$, and means for incrementing TAT by a numeric value I and identifying a cell conforming if TAT is less than or equal to $t_a(k)+L$ or if either of the Test Conditions are true.

The device may include a one_second_update flag having an output coupled to an input of the processor and an output of the processor coupled to a reset input of the one_second_update flag and a set input coupled to a user setable clock wherein when the flag is set, the device sets TAT equal to $t_a$.

In another aspect of the invention there is provided a method of determining compliance or non-compliance of an arriving cell. The method includes measuring the time of arrival of the first cell and setting TAT=$t_a(1)$. After initializing, the method includes measuring the time of arrival of each succeeding $k^{th}$ cell, testing if TAT<$t_a(k)$, testing if the most significant bit of $k^{th}$ cell time-of-arrival, $t_a(k)[n-1]$ equals zero and the most significant bit of the $k-1^{th}$ previous cell time of arrival, $t_a(k-1)[n-1]$=1, and setting TAT=$t_a$ if the answer to both of the latter two steps is yes.

The method further includes determining if $t_a(k)+L<$TAT, declaring the cell to be non-conforming if the answer to step (g) is yes, indexing TAT by I if the answer to step (g) is no and repeating foregoing steps following initialization for each subsequent cell.

The method may further include comparing a one_second_update flag to one and, if one, setting TAT=$t_a$ and after indexing TAT or declaring a cell to be non-conforming, clearing the one_second_update flag and returning to the step following initialization.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

FIG. 3 is a schematic diagram of cell arrival times for a limit value, L, of 0.5 times δ, the time to send one cell;

FIG. 4 is a schematic diagram of cell arrival times for a limit value, L, of 1.5 times δ;

FIG. 5 is a schematic diagram of cell arrival times for a limit value, L, of 3.5 times δ;

DETAILED DESCRIPTION WITH REFERENCE TO THE DRAWINGS

Figure 1:
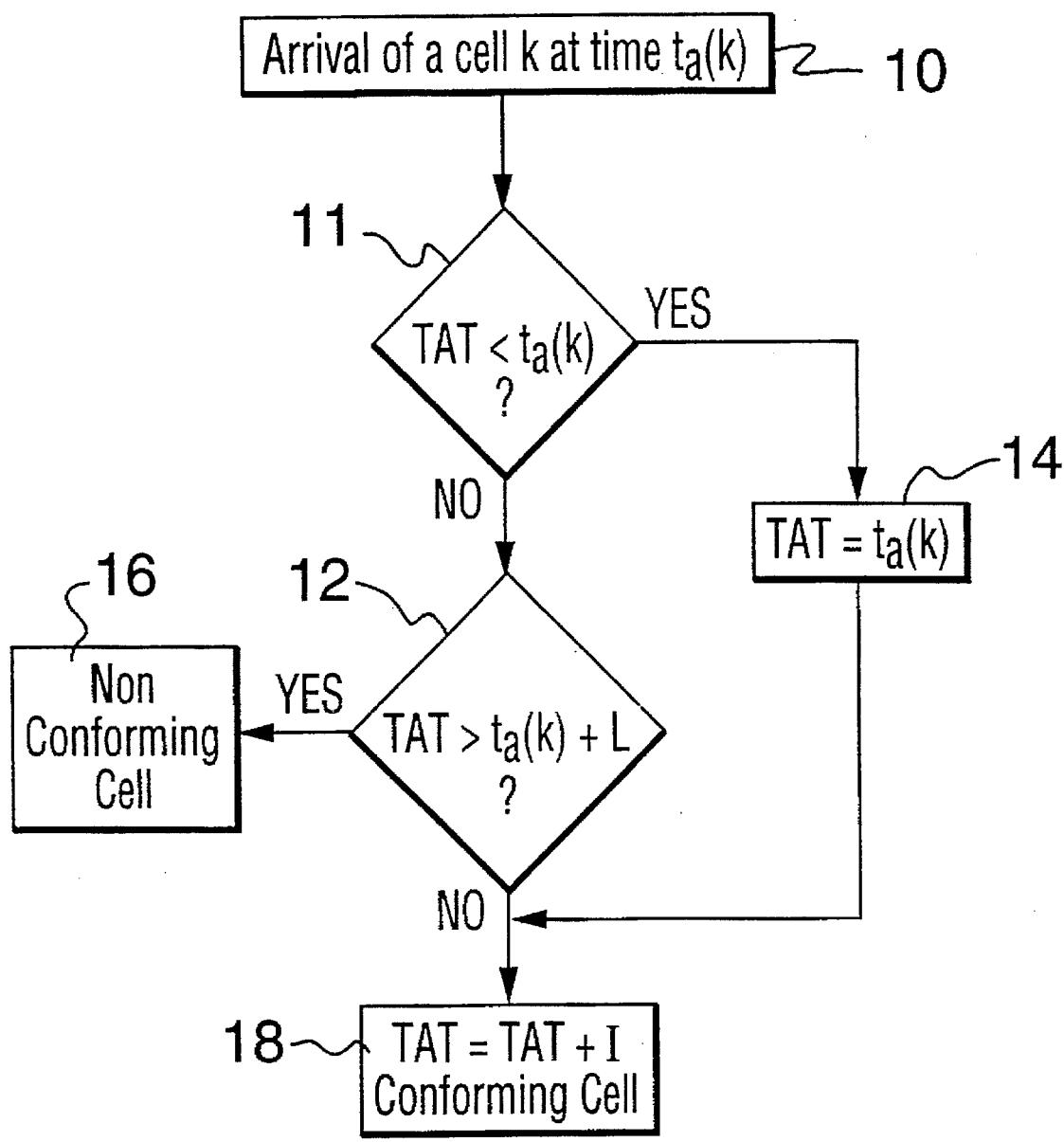
FIG. 1 is a decision tree corresponding to a virtual scheduling algorithm.

Referring to FIG. 1 the virtual scheduling algorithm known in the industry tests a cell k arriving at time $t_a(k)$ at step 11 by comparing a theoretical arrival time, TAT, with the cell arrival time, $t_a(k)$.

Initially, at the arrival time of the first cell $t_a(1)$, the theoretical arrival time TAT is updated to the current time, $t_a(1)$. For subsequent cells, if the arrival time of the $k^{th}$ cell, $t_a(k)$, is later than TAT then the cell is conforming and TAT is set equal to $t_a(k)$ at step 14 and an increment I added at step 18.

If the arrival time, $t_a(k)$, of the $k^{th}$ cell is greater than TAT-L as determined at step 12, then because of the outcome of step 11 and step 12 combined, $t_a(k)$ will be greater than TAT-L and less than or equal to TAT. In the latter case the cell is conforming and TAT is incremented by I. Here L is a limit value for time of arrival variation from the theoretical time of arrival. If $t_a(k)$ is less than TAT-L then the cell is nonforming as established at step 16 and TAT is unchanged. The virtual scheduling algorithm depends on the increment parameter, I and the limit parameter, L. If the arrival time is after TAT-L then the cell is conforming, otherwise it is non-conforming.

Figure 2:
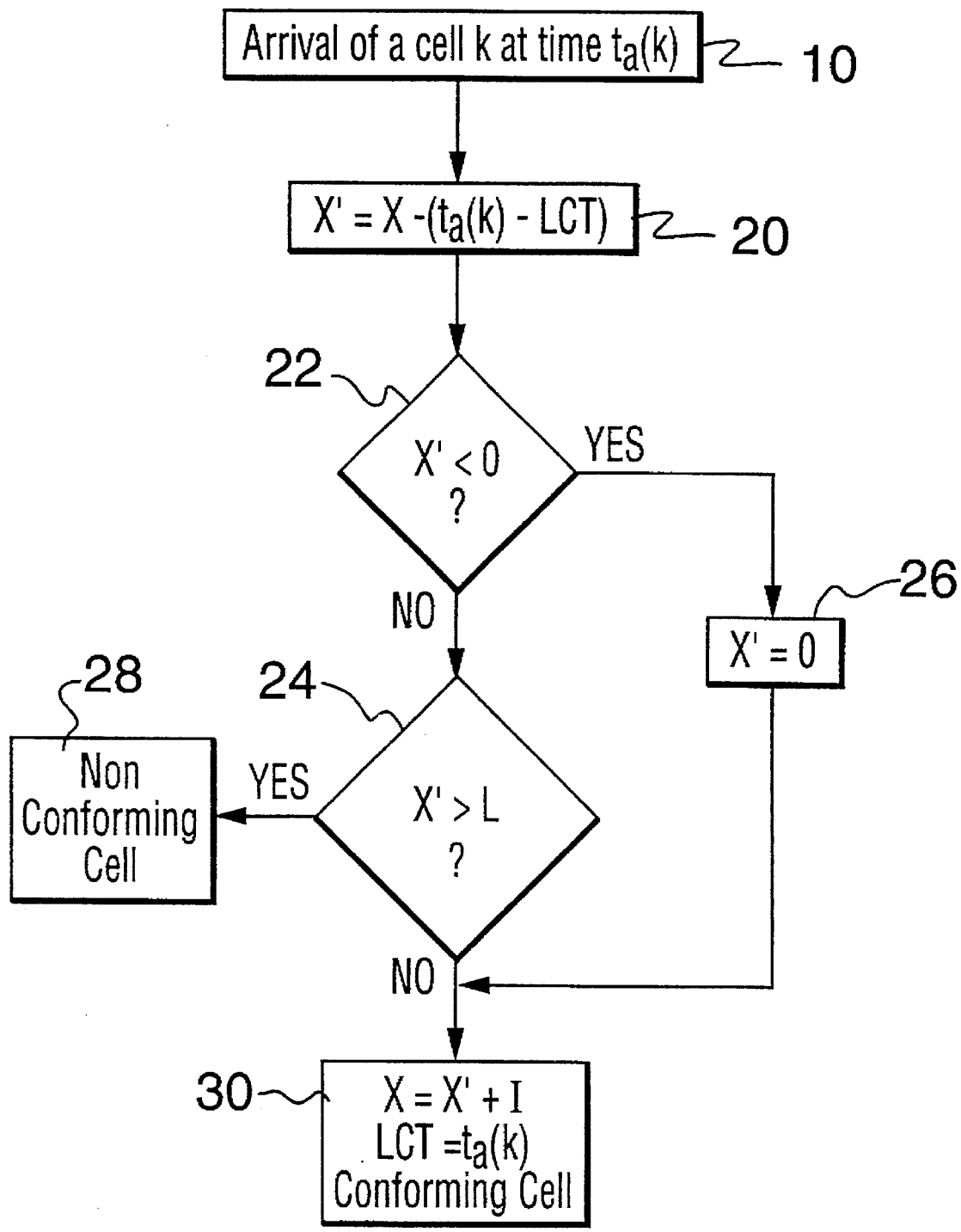
FIG. 2 is a decision tree corresponding to a leaky bucket algorithm.

An alternative but equivalent algorithm, known as the continuous-state leaky bucket algorithm, is shown in FIG. 2. In this case the contents of the bucket, X, is set to zero on the arrival of the first cell $t_a(1)$ and a parameter known as the last conformance time, LCT, is set to $t_a(1)$. At the arrival time of the $k^{th}$ cell, $t_a(k)$, the content of the bucket is provisionally updated to X' at step 20, which equals the content of the bucket, X, after the arrival of the last conforming cell minus the amount the bucket has drained since that arrival, where the content of the bucket is constrained to be non-negative. The amount of drainage is equal to the arrival time, $t_a(k)$ less the last conformance time LCT. Low values of $t_a(k)$ (or higher rates of arrival of pulses) relative to the LCT cause the bucket to fill and conversely high values of $t_a(k)$ relative to the LCT cause the bucket to empty. If at step 22, the values of X' is less than zero, it is set to zero at step 26, and X is incremented by I at step 30 where LCT is set equal to $t_a(k)$. If X' is greater or equal to zero then at step 24 it is checked to see whether or not it is greater than a limit parameter, L. If it is greater than L, it is declared non-conforming at step 28. If it is not greater than L, the system goes to step 30 and is incremented at step 30 by I where LCT is set equal to $t_a(k)$.

For either algorithm, the smaller is L, the less the variations in cell arrival time that will be tolerated. As seen from FIGS. 3, 4, and 5 the possible cell arrival times is shown for various values of the limit value, L, as a function of the time, δ, required to send 53 octets (1 cell) at an ATM layer data rate 150 Mb/s. For L=0.5 δ the variations of arrival times from the incremented values of TAT are relatively small whereas for L=3.5 δ, the variations are much larger with cell clumping occurring.

In any implementation of a cell policing system, it is important to ensure that, apart from conforming to the standards set by ITU-1.371, no compliant cells are ever identified as non-compliant and that the system can perform this logic at operating speeds as high as or higher than 622 Mbps as are currently achieved. Because any hardware system for keeping track of time requires some type of counter, a problem exists whenever the counter rolls over, in that the next time value will be close to zero and much less than the previous time value and the first cell to arrive after roll-over will be declared non-conforming even if it is conforming.

Figure 6:
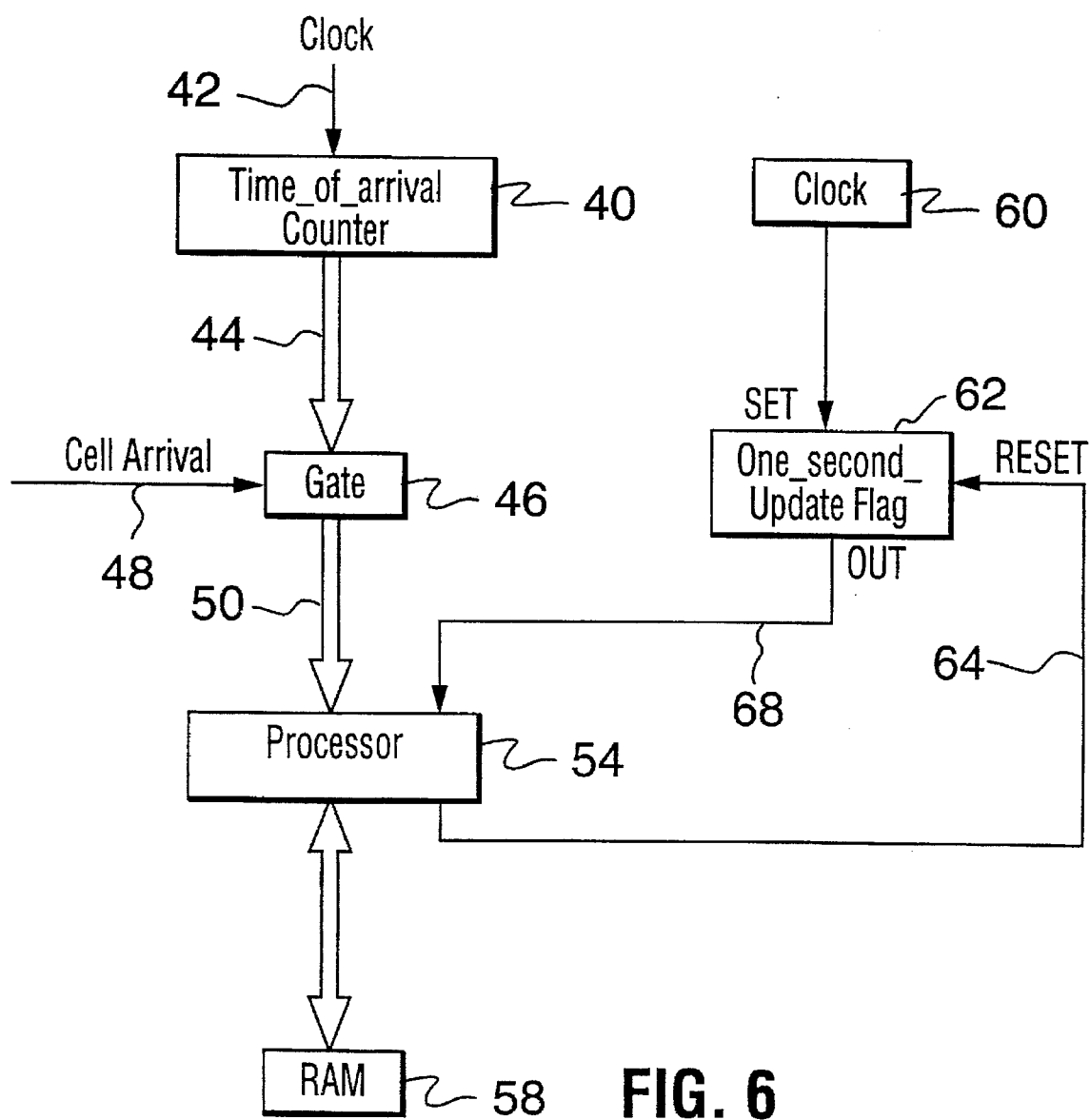
FIG. 6 is a schematic drawing of the cell traffic conformity evaluator.

Referring to FIG. 6, a system to implement the determination as to conforming and non-conforming cells consists of a finite word-length counter 40 having a clock input 42 and an n-bit parallel output on bus 44 to gate 46. The n-bit parallel output from gate 46 goes to an input of a processor 54 in response to a cell arrival signal on line 48. Processor 54 communicates with RAM memory 58. A one_second_update flag 62 has an input from clock 60 which provides an output at typically about 1 second intervals, but must occur at an interval less than one-half of the rollover period of the time-of-arrival counter 40. One_second_update flag 62 provides an output on line 68 to processor 54 in response to an input signal from clock 60. A reset line 64 from an output of processor 54 goes to a reset input of one_second_update flag 62.

In operation time-of-arrival counter 40 counts clock pulses from line 42 and provides an n-bit running parallel output on bus line 44 to gate 46. The latter n-bit parallel output passes through gate 46 to bus line 50 in response to the arrival of a cell arrival signal on line 48. The cell arrival signal is issued upon completion of arrival of a 53 octets of data. The time of arrival on bus line 50 is applied to an input of processor 54 giving to processor 54 the time of arrival for each cell. Processor 54 stores this value in RAM memory 58. Processor 54 also has stored the values of the theoretical arrival time, TAT, and the increment, I. Processor 54 goes through a routine to determine whether or not the cell that has just arrived is in conformance with the user supplied parameters index I, and limit value, L as explained below. Upon completion of processing time for the cell arriving just after rollover, during which time the processor 54 suspends processing of the cell arrival time, a reset signal is sent by processor 54 to the reset input of one_second_update flag 62 which resets the latter and removes the flag input on line 68.

Figure 7:
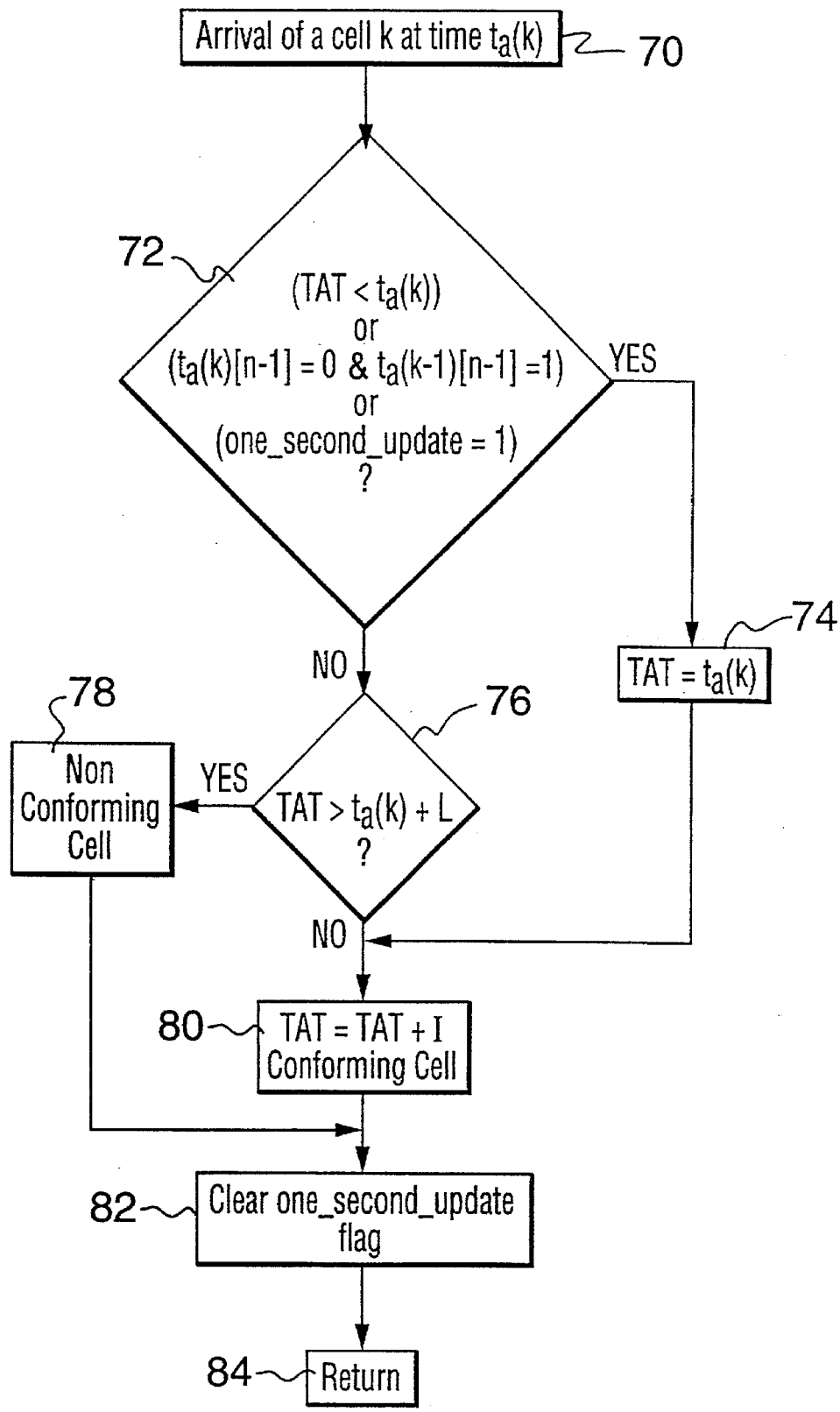
FIG. 7 is a decision tree for the operation of the circuit of FIG. 6.

Referring to FIG. 7, if $t_a(k)[n-1:0]$ is the finite-word length n-bit value corresponding to $t_a(k)$, and $t_a(k)[n-1]$ is the most significant bit from the output of the time-of-arrival counter 40 as presented at step 70 then the first condition at step 72 is to determine whether or not $t_a(k)$ is greater than TAT. A second alternative test is to compare the most significant bit of the $k^{th}$ cell time of arrival, $t_a(k)[n-1]$ to the most significant bit of the $k-1^{th}$ (previous) cell, $t_a(k-1)[n-1]$. If $t_a(k)[n-1]=0$ and $t_a(k-1)[n-1]=1$, then the time-of-arrival counter 40 has rolled over and policing should be suppressed on this cell to ensure a compliant cell is not declared non-compliant. Finally, to prevent incorrect identification of non-compliant cells on very slow rate connections, a flag known as the one_second_update flag 62 is set to 1 on one-second intervals as delimited by clock 60. This one_second_update flag is an external process which updates the one_second_update flag 62 at regular (nominally one second) intervals as delimited by clock 60. It is important to note that the one_second_update flag need only be set at an interval less than half of the rollover period of the time-of-arrival counter 40. If this flag is set, then policing will also be suppressed for the current cell. If the one_second_update flag 62 is set, it is cleared immediately upon completion of the algorithm. If all comparisons in the first decision branch fail, then the algorithm next tests if TAT>$t_a(k)$+L at step 76 to determine compliance. If the test is "yes" then the cell is declared non-conforming at step 78 while if the answer is "no" then TAT is indexed by I at step 80.

If any one of the three tests in step 72 is passed, then TAT is set equal to $t_a(k)$ at step 74 and then the test at step 76 is implemented as explained above. In either case the one_second_update flag is cleared at step 82 and the system returns to the beginning at step 84 to process the time-of-arrival of the next cell.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

We claim:

1. A system for determining compliance of cells in a cell based transmission system having an initial theoretical cell arrival time, TAT, the system comprising:

(a) an n-bit word-length counter having an input coupled to a source of clock pulses;

(b) a parallel n-bit word-length gate coupled to a parallel output of said n-bit word-length counter and having a gate input coupled to a source of cell arrival signals;

(c) a processor coupled to an output of said gate, having (i) means for determining each of (aa) if TAT is less than an arrival time for a $k^{th}$ cell, $t_a(k)$, where k is an integer, and (bb) if in $(n-1)^{th}$ bit of $t_a(k)$, namely $t_a(k)[n-1]$, is zero and an $(n-1)^{th}$ bit of an arrival time for a $(k-1)^{th}$ cell, namely $t_a(k-1)[n-1]$, is one;

(ii) means for setting TAT equal to $t_a(k)$ if either of the two conditions (aa) and (bb) in (c)(i) are true;

(iii) means for determining if TAT is greater than $t_a(k)+L$, where L is a limit value for cell time of arrival variation, if each of the two conditions in (c)(i) are not true;

(iv) means for identifying a cell non-conforming if TAT is greater than $t_a(k)+L$; and (v) means for incrementing TAT by a numeric value I and identifying a cell conforming if either of the two conditions in (c)(i) are true or the condition in (c)(iii) is not true.

2. A system according to claim 1, including a one_second_update flag generator for a one second update flag having an output coupled to an input of said processor and an output of said processor coupled to a reset input of said one_second_update flag generator and a set input coupled to a user setable clock wherein when said flag is set, said means for setting TAT sets TAT equal to $t_a(k)$.

3. A method of determining compliance or non-compliance of an arriving cell, comprising:

(a) measuring a time of arrival of a $k^{th}$ cell, namely $t_a(k)$, where k is an integer value initially equal to 1;

(b) setting a theoretical arrival time, TAT, equal to $t_a(k)$;

(c) incrementing k by the integer value one;

(d) measuring a time of arrival of a cell k, namely $t_a(k)$;

(e) testing if TAT is less than $t_a(k)$;

(f) testing if a most significant bit of $t_a(k)$, namely $t_a(k)[n-1]$, is zero, and if a most significant bit of a time of arrival of a $(k-1)^{th}$ cell, namely $t_a(k-1)[n-1]$, equals one;

(g) setting TAT equal to $t_a(k)$, if the result of either step (e) or (f) is yes;

(h) determining if TAT is greater than $t_a(k)+L$, where L is a limit value for cell time of arrival variation;

(i) declaring said $k^{th}$ cell to be non-conforming if the answer to step (h) is yes;

(j) incrementing TAT by a numeric value I and declaring said $k^{th}$ cell to be conforming if the answer to step (h) is no;

(k) incrementing k by 1; and (l) repeating steps (d) to (l) inclusive for each subsequent arriving cell.

4. A method according to claim 3, including after step (c), (d), or (e) comparing a one_second_update flag to one and, if said one second update flag is one, setting TAT equal to $t_a(k)$ and after indexing TAT or declaring a cell to be non-conforming, clearing the one_second_update flag and returning to step (c).

5. A system according to claim 1, including memory coupled to said processor operative to store values of $t_a(k)$, $t_a(k-1)$, TAT, L and I.

* * * * *